United States Patent [19]

McKee et al.

[11] Patent Number: 4,710,660
[45] Date of Patent: Dec. 1, 1987

[54] SOLENOIDAL HOMOPOLAR GENERATOR

[75] Inventors: Bobby D. McKee; Michael P. Cain, both of San Jose; Robert M. Delvecchio, Sunnyvale; Emmanuel Aivaliotis, San Jose, all of Calif.

[73] Assignee: Westinghouse Electric Corp., Pittsburgh, Pa.

[21] Appl. No.: 912,736

[22] Filed: Sep. 29, 1986

[51] Int. Cl.⁴ ............................................. H02K 31/00
[52] U.S. Cl. ..................... 310/178; 310/148; 310/184; 310/219; 310/239
[58] Field of Search ............... 310/219, 239, 178, 238, 310/254, 242, 102 A, 261, 232, 149, 148, 248, 184, 249, 208, 233, 256, 48; 318/253

[56] References Cited

U.S. PATENT DOCUMENTS

| | | | |
|---|---|---|---|
| 1,922,028 | 8/1933 | Chandeysson | 310/178 |
| 2,134,510 | 10/1938 | Hague | 310/178 |
| 2,230,131 | 1/1941 | Chandeysson | 310/178 |
| 3,229,133 | 1/1966 | Sears | 310/178 |
| 4,271,369 | 6/1981 | Stillwagon | 310/178 |
| 4,602,179 | 7/1986 | Kuznetsov | 310/256 |

FOREIGN PATENT DOCUMENTS

| | | | |
|---|---|---|---|
| 0866526 | 7/1949 | Fed. Rep. of Germany | 310/248 |
| 0554822 | 6/1923 | France | 310/178 |
| 8604191 | 7/1986 | PCT Int'l Appl. | 310/178 |
| 2107937 | 5/1983 | United Kingdom | 310/178 |

Primary Examiner—R. Skudy
Attorney, Agent, or Firm—R. P. Lenart

[57] ABSTRACT

A solenoidal homopolar dynamoelectric machine is provided with inner and outer field coils positioned on opposite sides of a current collecting zone of a rotor which is mounted for rotation with respect to a stator structure. An additional field shaping coil or a tilted brush box current collector is used to conduct current in a circumferential direction near the current collection zone of the rotor to reduce the radial components of magnetic flux in the current collection zone. This reduces circulating currents in the brush assembly.

7 Claims, 18 Drawing Figures

SOLENOIDAL HOMOPOLAR GENERATOR

BACKGROUND OF THE INVENTION

This invention relates to dynamoelectric machines and more particularly to homopolar generators having means for reducing circulating currents in their current collecting zones.

Homopolar generators have been successfully designed for providing short duration pulses having a peak current level in excess of a million amperes DC. Such generators usually include a cylindrical rotor of either a drum or disc configuration, rotatably mounted within a stator structure. A field coil encircling the rotor and connected to an external current supply provides an applied magnetic field excitation passing through the rotor. The applied magnetic field excitation is usually confined and directed by a ferromagnetic stator structure surrounding the field coil and all, or a portion of, the rotor. When the rotor is spinning, free electrons within the rotor experience an electromotive force resulting from their interaction with the applied magnetic field excitation. Current collecting brushes are lowered onto the spinning rotor to allow an electrical current to flow under the influence of this electromotive force through return conductors to an external circuit and then back onto the rotor through additional brushes at a different location. It has been found that extremely high current pulses may be obtained by using a relatively low power conventional prime mover to store initial energy in the rotor by gradually motoring the rotor up to the desired rotational speed.

In order to achieve weight and volume reductions, the magnetic rotor of a homopolar generator may be replaced by a hollow non-magnetic cylinder supported on a shaft by spokes to form an air core machine. At the same time, the magnetic stator may be replaced by a non-magnetic stator structure. Since such an air core homopolar generator would have no preferred magnetic paths, magnetic flux crossing the rotor surface can possess significant axial as well as radial components. Circulating currents caused by relatively high radial magnetic flux components in the current collection zone of homopolar generators are responsible for many of the limitations of current machines. Minimization of such currents by reduction of the radial components of the magnetic field in the current collection region, while maintaining high radial fields in the active region, is desirable.

SUMMARY OF THE INVENTION

Homopolar generators constructed in accordance with the present invention would utilize two coils on opposite sides of a current collecting zone to produce a generally solenoidal magnetic field which passes radially into a central portion of a rotor and axially along the rotor in a current collection zone. Means would be provided to force the magnetic flux to flow axially within the current collection zone of the rotor. These means may include a third coil positioned between the two excitation coils and/or a tilted brush assembly which adds a circumferential component to the collected current.

DESCRIPTION OF THE PREFERRED EMBODIMENTS

While the basic concept of the present invention is applicable to iron core, insulated drum, hybrid and other types of homopolar generators, it is particularly applicable to air core machines as illustrated in the following preferred embodiments.

Figure 1:
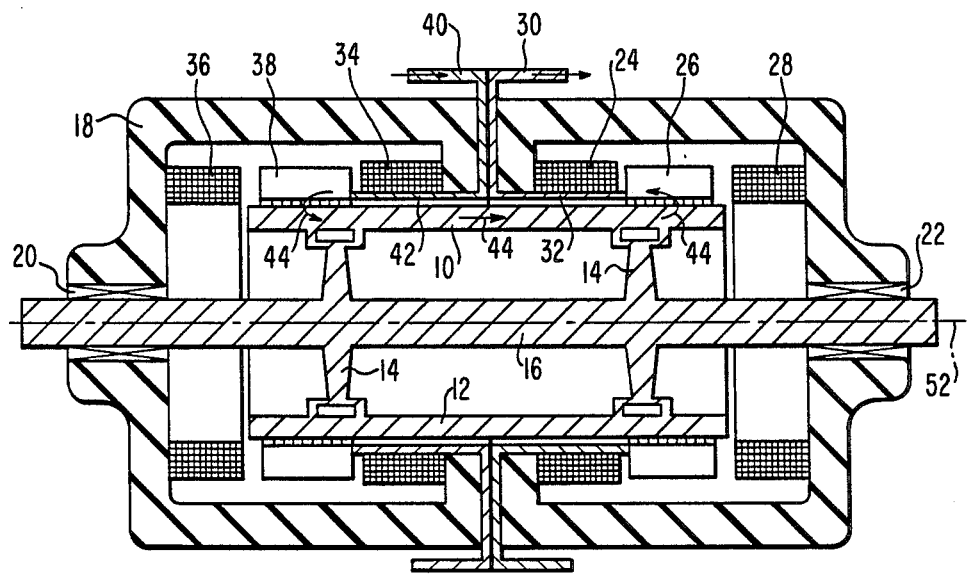
FIG. 1 is an axial cross-section of a solenoidal air core homopolar generator designed in accordance with one embodiment of the present invention.

Referring to the drawings, FIG. 1 is an axial cross-section of a solenoidal air core homopolar generator designed in accordance with one embodiment of the present invention. A rotor 10 comprising a non-magnetic cylinder 12 supported by spokes 14 on shaft 16 is mounted for relative rotation with a non-ferromagnetic stator structure 18 by way of bearings 20 and 22. A first inner field coil 24 encircles the rotor and is connected in accordance with known connection techniques to an external current source, not shown, to produce solenoidal magnetic flux which passes radially into a central portion of the rotor and axially along a current collection zone which lies beneath current collecting brush assembly 26. A first outer field coil 28 lies adjacent to one end of the rotor cylinder 12 and is also connected to the external current source. The first inner field coil and the first outer field coil are wound to produce magnetic flux of the same polarity. A conductor 30 is connected by way of a cylindrical conductor 32 to current collecting brush assembly 26 for the purpose of passing generated current to an external load. A second inner field coil 34 and a second outer field coil 36 are positioned on opposite sides of a second brush assembly 38 and are also connected to an external current source and wound to produce magnetic flux in the same direction. However, the direction of the magnetic flux produced by the first inner and outer field coils will be opposite to the direction of magnetic flux produced by the second inner and outer field coils. Brush assembly 38 is connected to conductor 40 by way of cylindrical conductor 42.

Figure 2:
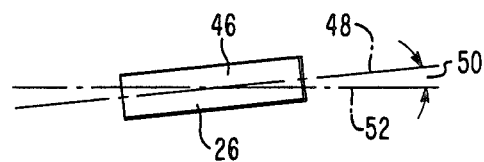
FIG. 2 is a schematic representation of a brush box which may be used in the generator of FIG. 1.

When an output pulse is desired, the rotor will be caused to spin by connecting a prime mover to shaft 16 in accordance with known technology. When the desired rotor speed has been reached, brush assemblies 26 and 38 are lowered into contact with the current collecting zones on the rotor surface and current illustrated by the arrows 44 is induced as a result of the interaction of the spinning conductive rotor shell with magnetic flux produced by current flowing in the inner and outer field coils. Since the machine of FIG. 1 uses a non-ferromagnetic stator which may be constructed of, for example, aluminum, non-magnetic steel, resin composite or fiberglass, there is no magnetic iron positioned radially behind the current collecting zones and consequently no preferred flux path which would tend to reduce radial components of the magnetic flux in the current collecting zones. Therefore, one must force the flux to flow axially within the rotor cylinder in the current collecting zones. One method of reducing radial flux in the current collecting zones is to cause a circumferential current flow adjacent to the current collecting zones. This can be accomplished as illustrated in FIG. 2 wherein a generally rectangular brush box 46 (one of many arranged cylindrically around the rotor to form current collecting brush assembly 26) has a major axis 48 which is inclined at an angle 50 with respect to the central axis 52 of the rotor 10. Since each of the brush boxes 46 in the current collecting brush assembly 26 is connected at one end to cylindrical conductor 32 in FIG. 1, current illustrated by arrows 44 in FIG. 1 which is collected along the length of the brush box 46 will include a circumferential component equal to the magnitude of the current times the sine of the angle 50 as it flows along the brush box toward the cylindrical conductor 32. In practice, the current collectors may include generally rectangular arrays of copper-graphite brush elements as used in prior art generators.

Figure 3:
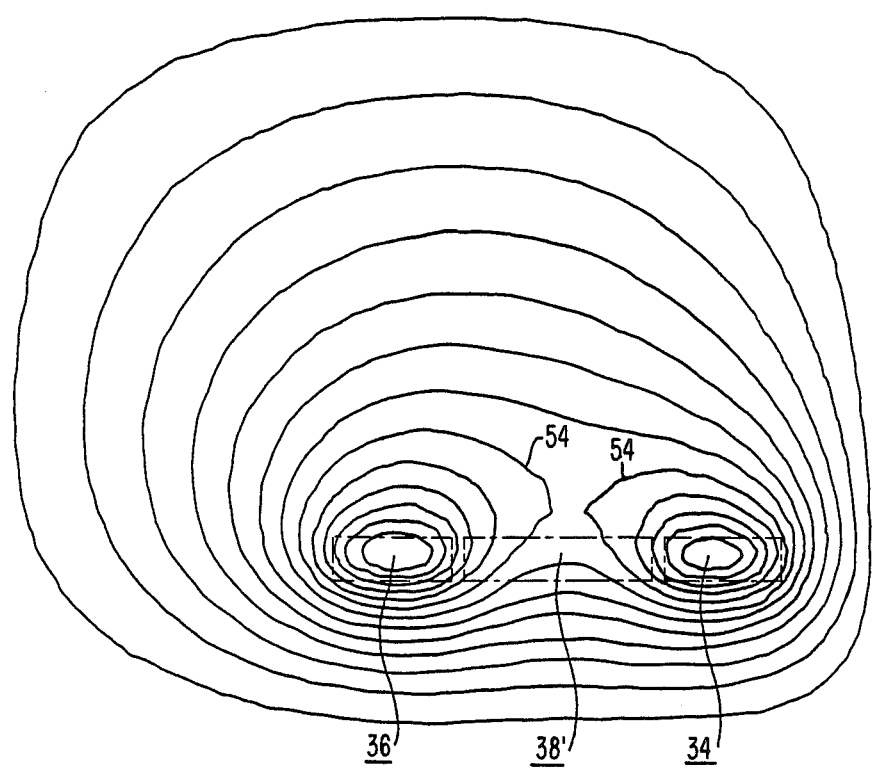
FIG. 3 is a computer generated flux plot of the steady state magnetic flux in one quarter of the generator of FIG. 1.
Figure 4A:
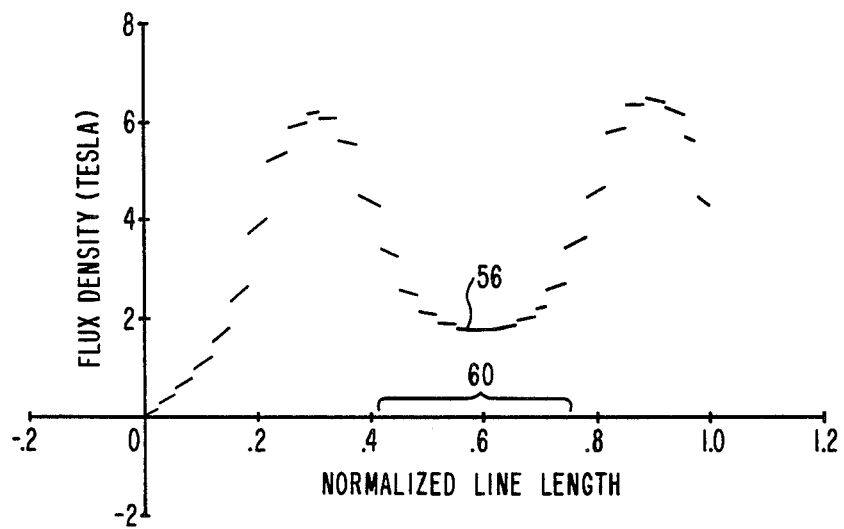
FIGS. 4A and 4B are computer generated plots of the axial and radial components of steady state magnetic flux along the drum surface in a portion of the generator of FIG. 1.
Figure 4B:
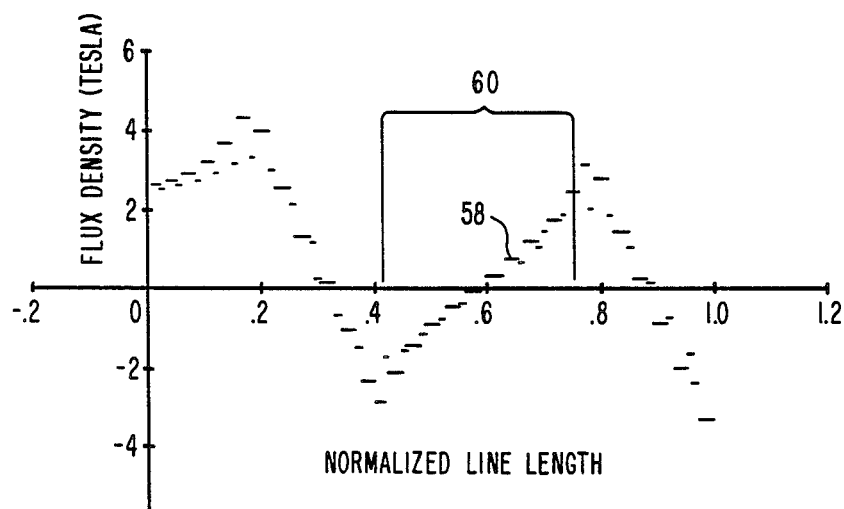

The computer generated flux plots of FIGS. 3 through 8 are included to illustrate the effect of tilting the brush box 46 on the axial and radial components of the steady state magnetic flux for several calculated examples using the machine configuration of FIG. 1. Due to the symmetries involved, only one fourth of the machine is shown. FIG. 3 is a computer generated plot of the magnetic flux 54 produced by an assumed current of 133,000 amps per square inch flowing in inner field coil 34 and outer field coil 36. In this example, it was assumed that the brush box of brush assembly 38' was oriented with its major axis in line with the central axis of the rotor, so that it contains no circumferential current components. FIGS. 4A and 4B are computer generated plots of the axial component 56 and the radial component 58 of the magnetic flux 54 of FIG. 3. Note the significant radial flux component appearing in the current collecting zone 60 in FIG. 4B and the corresponding decreased axial flux component in the current collecting zone 60 in FIG. 4A. Radial flux in the current collection region causes circulating currents in the brush and rotor structures.

Figure 5:
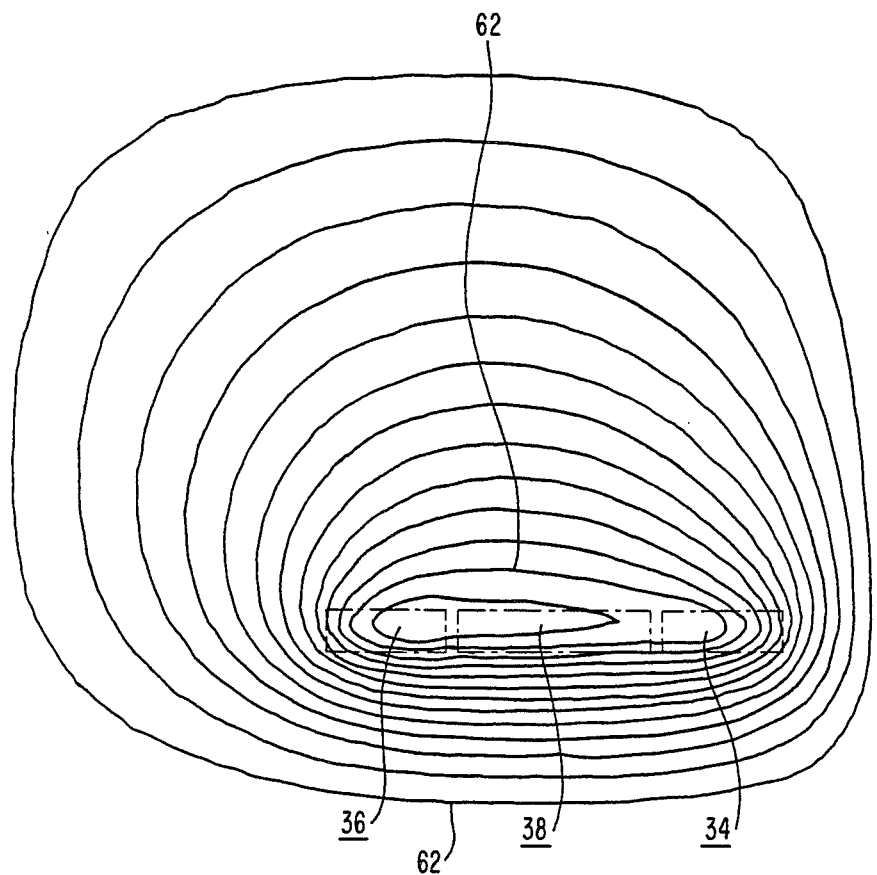
FIG. 5 is a computer generated plot of the steady state magnetic flux of the generator of FIG. 1, using the tilted brush assembly of FIG. 2.
Figure 6A:
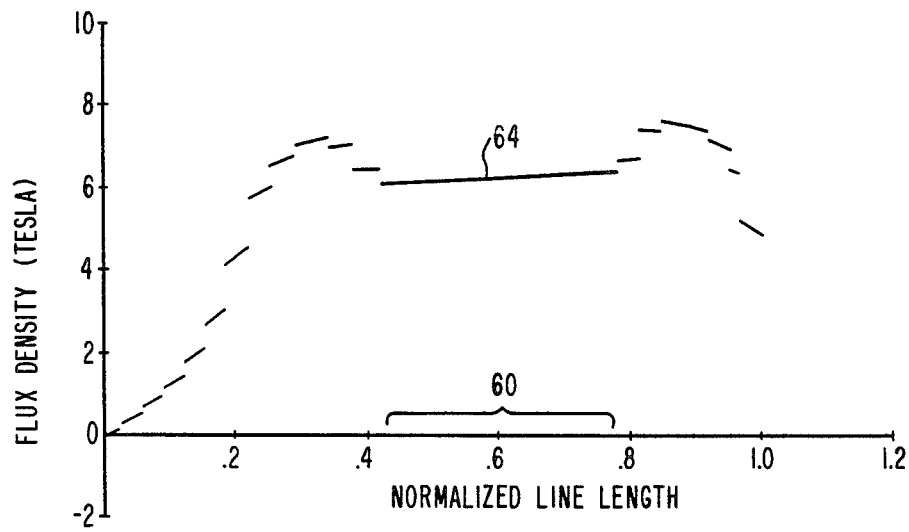
FIGS. 6A and 6B are computer generated plots of the axial and radial components of the steady state magnetic flux along the drum surface illustrated in FIG. 5.
Figure 6B:
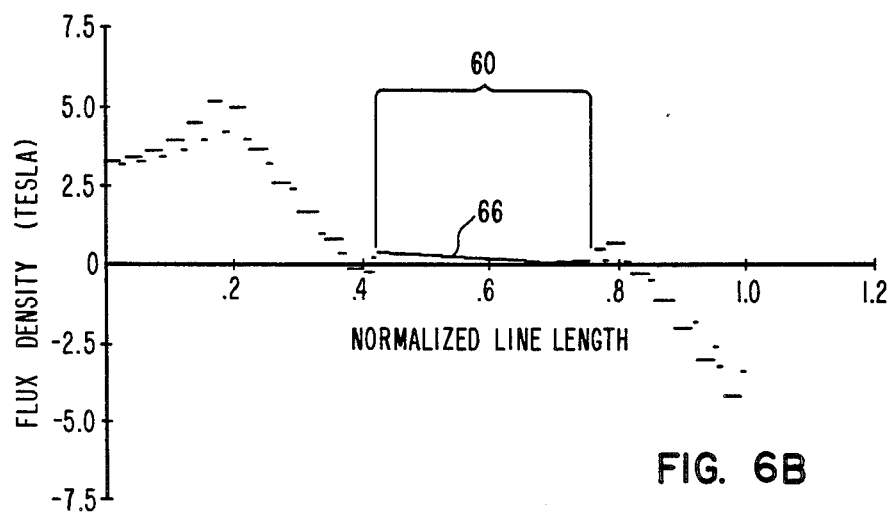

FIG. 5 is a computer generated plot of the magnetic flux 62 for the machine of FIG. 1 wherein it has been assumed that 133,000 amps per square inch are flowing in coils 34 and 36 and that the brush box of brush assembly 38 is inclined at such an angle that the circumferential component of the current flowing in the brush box assembly is equal to 80,000 amps per square inch. FIGS. 6A and 6B are computer generated plots of the axial component 64 and the radial component 66 of the magnetic flux 62 in FIG. 5. Note that the use of a tilted brush box has significantly decreased the radial component of magnetic flux 66 in the current collection zone as illustrated in FIG. 6B, while simultaneously significantly increasing the axial component 66 of magnetic flux in the current collection zone 60 as illustrated in FIG. 6A.

Figure 7:
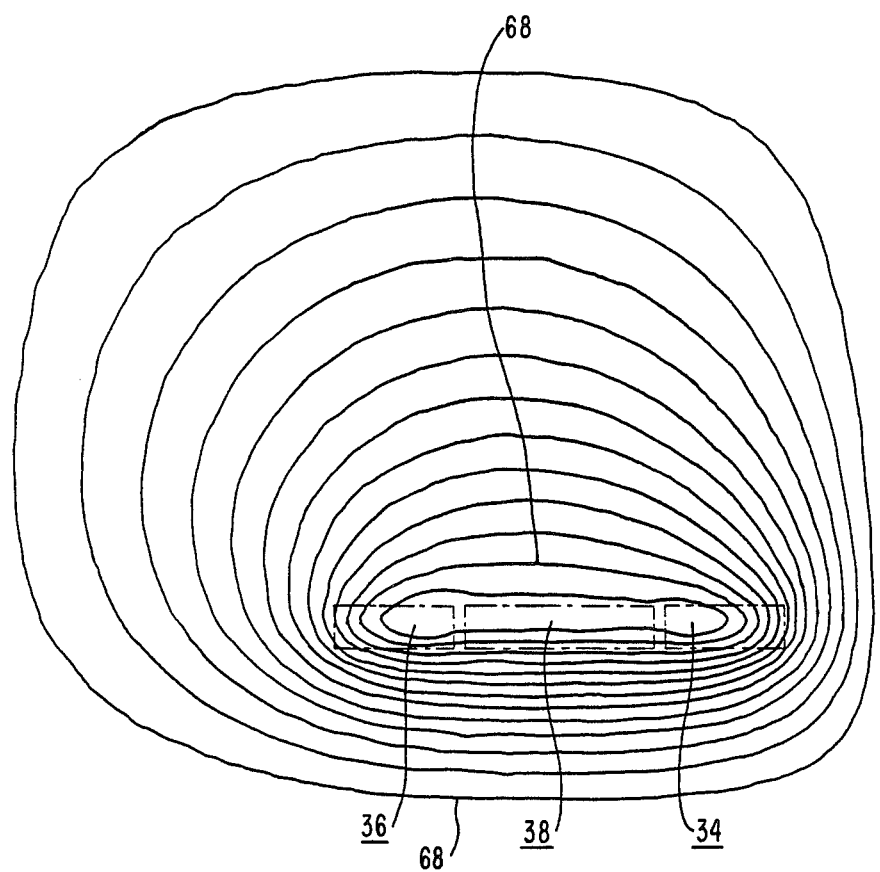
FIG. 7 is a computer generated steady state flux plot for an optimized embodiment of the generator of FIG. 1.
Figure 8A:
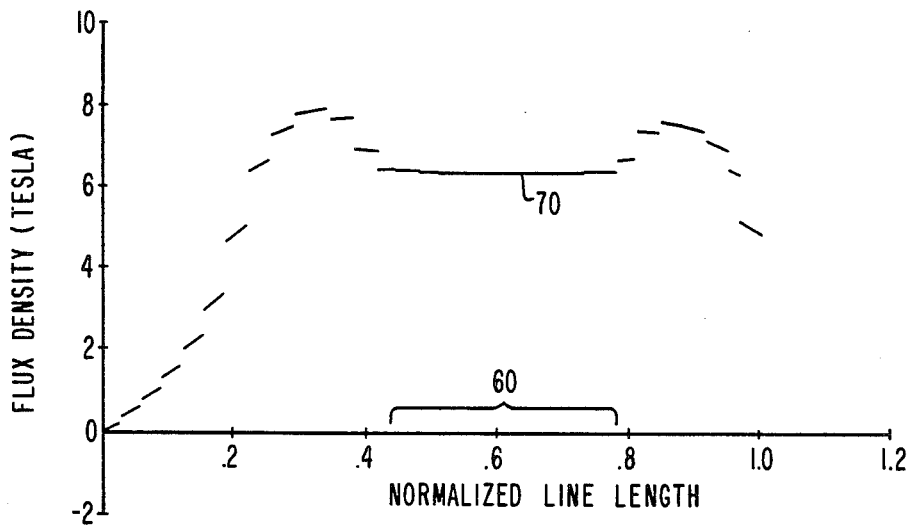
FIGS. 8A and 8B are computer generated plots of the axial and radial components of the steady state magnetic flux along the drum surface illustrated in FIG. 7.
Figure 8B:
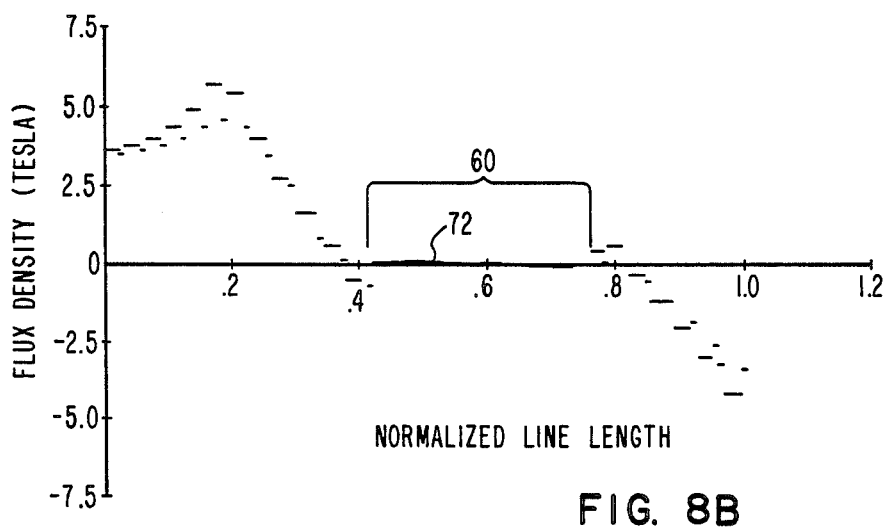

FIG. 7 is a computer generated plot of the magnetic flux produced in the machine of FIG. 1 under optimized conditions. In that figure, the magnetic flux 68 has been produced by assuming that coil 34 carries 150,000 amps per square inch, coil 36 carries 133,000 amps per square inch and the brush box of brush assembly 38 has been tilted at such an angle that the circumferential component of current flowing in the brush box is 80,000 amps per square inch. By referring to FIGS. 8A and 8B, it is apparent that the axial component 70 of the flux 68 of FIG. 7 in the current collecting zone 60 is approximately constant and the radial component 72 of the flux 68 of FIG. 7 in the current collecting zone 60 has been reduced to approximately zero under these optimized conditions.

The machine of FIG. 1 may be referred to as a self-compensating solenoidal homopolar machine. It is lighter and more compact than conventional homopolar generators since it uses a non-ferromagnetic stator structure and a hollow, non-magnetic cylindrical rotor supported by spokes. Although four field coils are illustrated, it should be understood that fewer or more field coils would also fall within the scope of this invention. By eliminating the ferromagnetic stator, this machine can utilize high magnetic fields which would tend to saturate a ferromagnetic stator.

In summary, voltage is generated in the active region of the homopolar generator of FIG. 1 by initially passing current through the inner and outer field windings and spinning the rotor. The tilted brush assemblies are then lowered onto the rotor and axial load current begins to flow. At the same time, a circumferential component of load current appears in the current collection zone due to tilting of the brush boxes. A solenoidal effect is thus produced, except that the current per unit length of the iner field coil, brush box and outer field coil assembly may not be the same. Circulating currents in the brush assemblies can be minimized by maintaining a particular ratio of currents in the inner coil, brush box and outer coil which is kept constant during operation.

In the case of an air core machine, where linearity holds, the results are valid at any load current level provided the proper current ratios in the coils and brush box are maintained. As load current of the homopolar generator changes, the circumferential ampere turns produced in the tilted brush boxes will also change and therefore the inner and outer field windings of the homopolar generator must be forced to carry changing amounts of current. This must be done in order to ensure that the desired current ratios are maintained. Although these ratios would be constant for air core machines, each machine geometry will have its own optimal ratio which is then valid for most practical current levels. This is not true for machines having ferromagnetic components, where saturation effects at different current levels may require these ratios to change. In that case, even though a more sophisticated control system would be required, the problem remains manageable.

Figure 9:
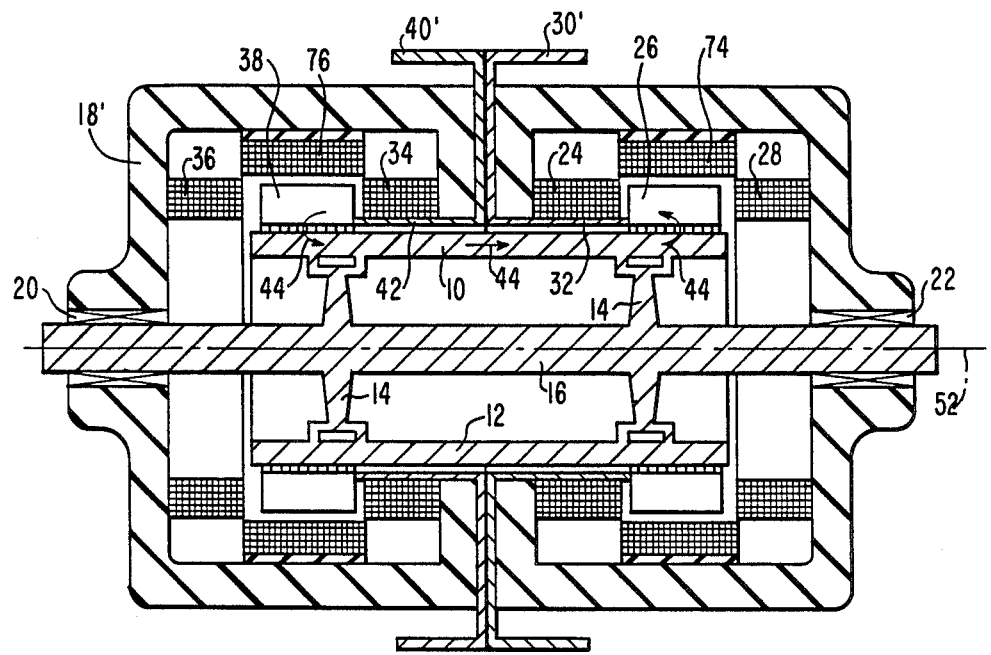
FIG. 9 is an axial cross-section of a homopolar generator designed in accordance with an alternative embodiment of the present invention.

FIG. 9 is an axial cross-section of a homopolar dynamoelectric machine designed in accordance with an alternative embodiment of the present invention. This embodiment uses numerous components which are identical to the machine of FIG. 1 and have been designated by their identical item numbers. Flux shaping coils 74 and 76 have been positioned adjacent to brush assemblies 26 and 38 and the radial dimensions of the stator 18' and conductors 30' and 40' have been increased to accommodate these flux shaping coils. Each of the flux shaping coils 74 and 76 will again be connected to an external current source and wound to produce magnetic flux in the same direction as its adjacent inner and outer coils. By adjusting the current levels in the flux shaping coils and the adjacent inner and outer coils, radial flux components in the current collection zone can again be minimized. The homopolar generator illustrated in FIG. 9 would operate in the same manner as the generator of FIG. 1 to produce output current. Although flux shaping coils 74 and 76 perform the same function as the tilted brush assemblies of the machine of FIG. 1, it should be understood that this invention encompasses the use of either the flux shaping coils, the tilted brush box assemblies, or both.

Figure 10:
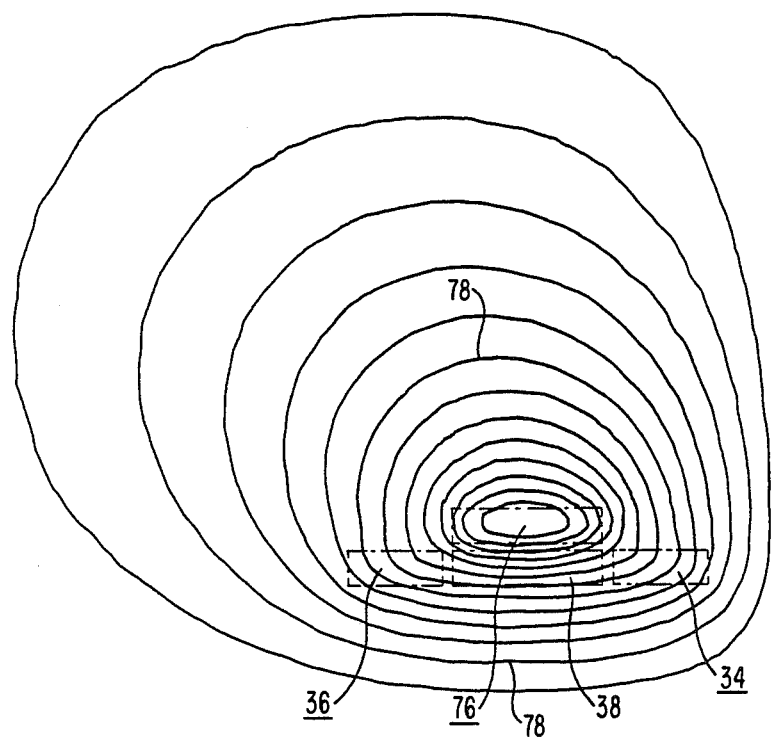
FIG. 10 is a computer generated plot of the steady state magnetic flux of the machine of FIG. 9.

FIG. 10 is a computer generated plot of the steady state magnetic flux 78 produced in the machine of FIG. 9 for assumed current densities of 100,000 amps per square inch in inner field coil 34, 80,000 amps per square inch in outer field coil 36, and 200,000 amps per square inch in field shaping coil 76. The main axis of the brush box has been assumed to be in line with the axis of the rotor for this example.

Figure 11A:
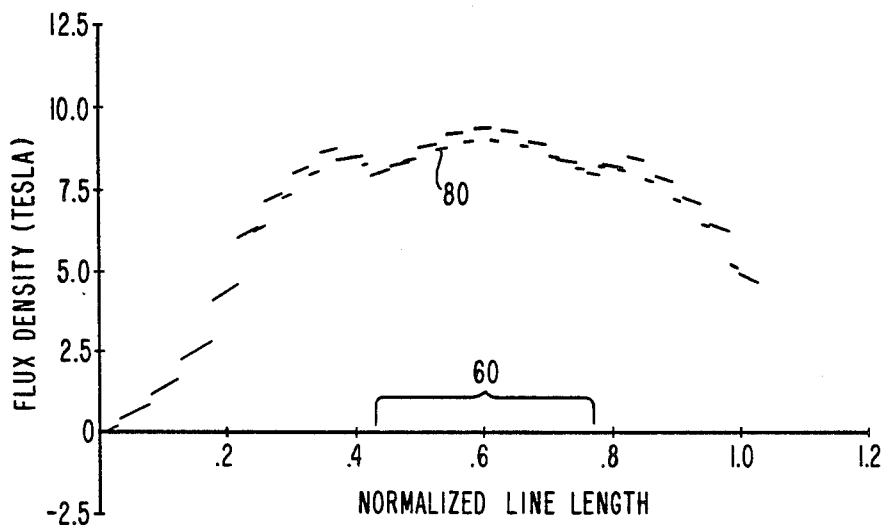
FIGS. 11A and 11B are computer generated plots of the axial and radial components of the steady state magnetic flux along the drum surface of FIG. 10.
Figure 11B:
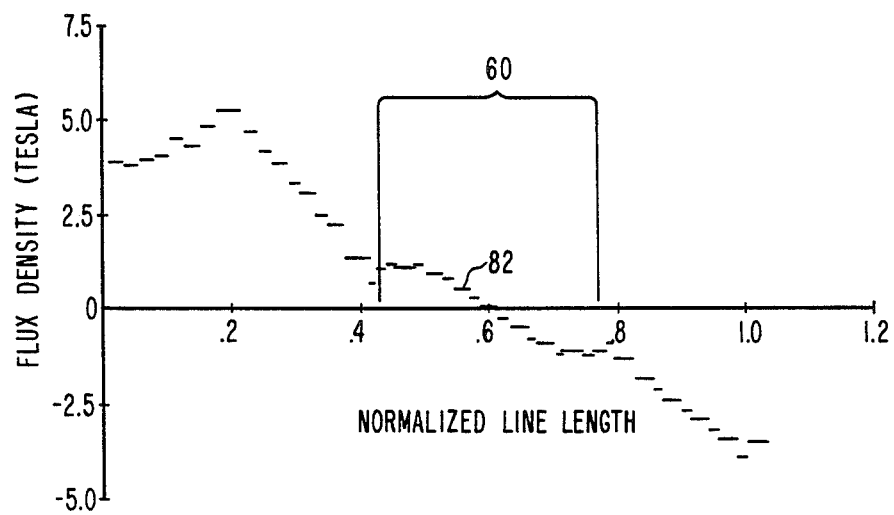

FIGS. 11A and 11B are computer generated plots of the axial component 80 and the radial component 82 of the magnetic flux 78 of FIG. 10. Note that a significant magnitude of radial flux component 82 still exists in the current collection zone 60.

Figure 12:
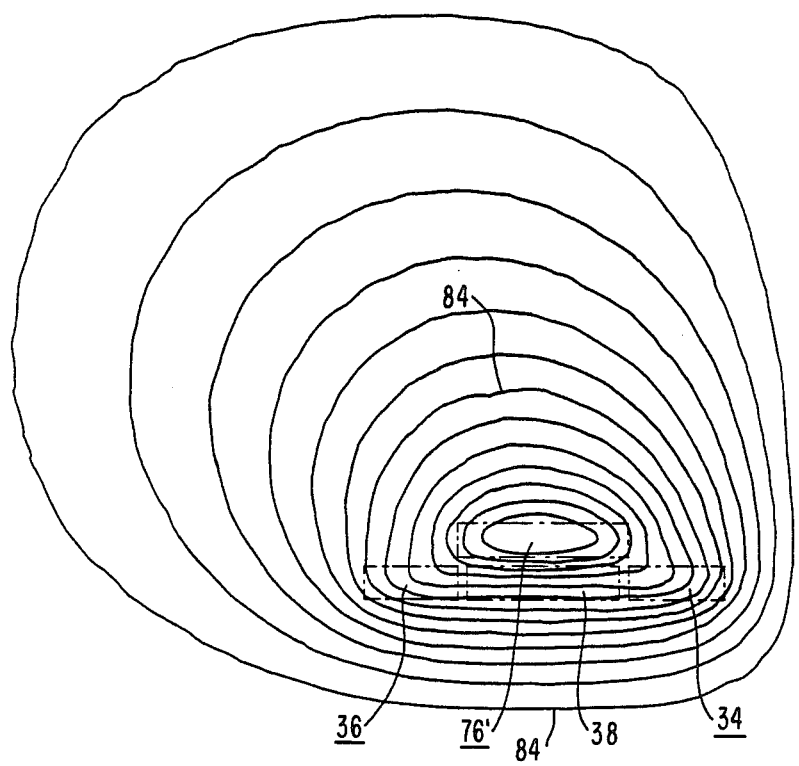
FIG. 12 is a computer generated plot of the steady state magnetic flux for an optimized version of the generator of FIG. 9.

FIG. 12 is a computer generated plot of the magnetic flux 84 of the machine of FIG. 9 under optimized conditions wherein a flux shaping coil 76' having a length which extends the full distance between inner field coil 34 and outer field coil 36 has been used. The current densities in FIG. 12 are the same as those in FIG. 10.

Figure 13A:
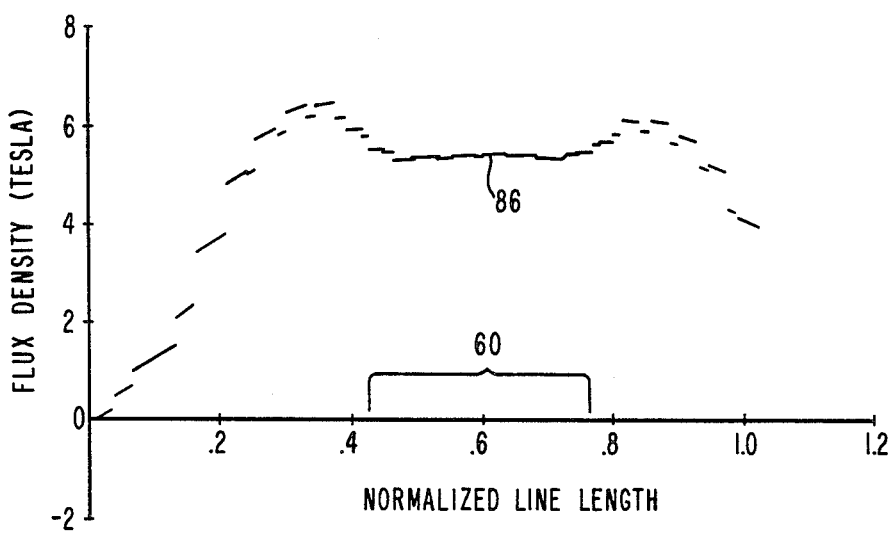
FIGS. 13A and 13B are computer generated plots of the axial and radial components of the steady state magnetic flux along the drum surface illustrated in FIG. 12.
Figure 13B:
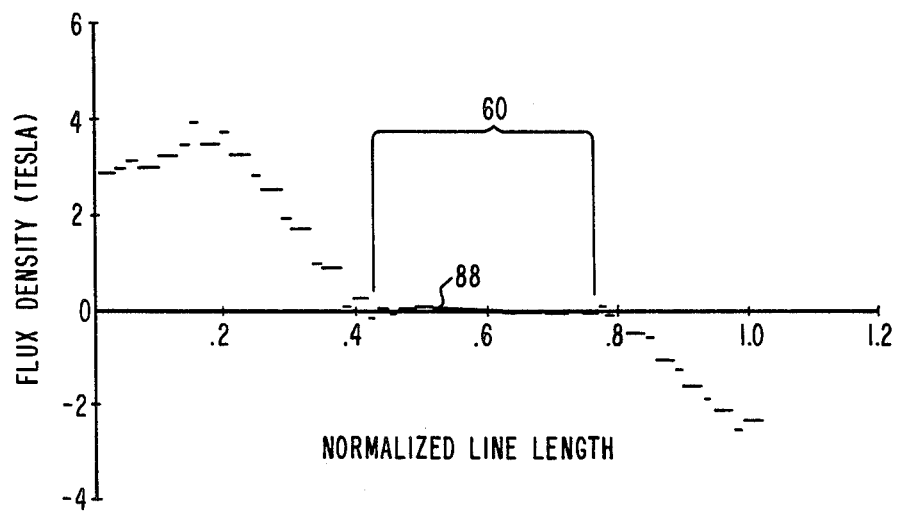

FIGS. 13A and 13B are computer generated plots of the axial component 86 and the radial component 88 of the magnetic flux 84 in FIG. 12. It can be seen that under these optimized conditions, the axial component 86 in the current collecting zone 60 remains approximately constant while the radial component 88 has been reduced to approximately zero in the current collecting zone 60.

Since the machines of FIGS. 1 and 9 use components with linear characteristics, machine performance with respect to reduced radial flux in the current collection zones will not deteriorate appreciably by scaling up the field currents as long as the current ratios are preserved. Therefore these machines can operate under various load conditions. It should be understood that the flux shaping coil is also applicable to conventional homopolar generators since it would help to suppress the saturate effects of the load current penetrating into rotor magnetic iron during discharge. In addition, in view of the high field coil currents needed to produce the required magnetic fields, superconductive coils should be considered.

Although the present invention has been described in terms of what are at present believed to be its preferred embodiments, it will be apparent to those skilled in the art that various changes may be made without departing from the scope of the invention. It is therefore intended that the appended claims cover such changes.

What is claimed is:

1. A dynamoelectric machine comprising:
   a stator structure;
   a rotor having a central axis, being positioned within said stator structure and being mounted for rotation with respect to said stator structure;
   a first inner field coil supported by said stator structure and positioned around a first portion of said rotor;
   a first outer field coil supported by said stator structure, concentric with said rotor axis and longitudinally spaced from said first inner field coil;
   said first inner and outer field coils being wound to produce solenoidal magnetic flux in the same direction; and
   a current collecting brush assembly for conducting current with a circumferential component to produce solenoidal magnetic flux in the same direction as magnetic flux produced by said first inner and outer field coils, said current collecting brush assembly including a plurality of brush boxes each connected at one end to a cylindrical conductor, each lying at an inclined angle with respect to the axis of said rotor and each being generally positioned between said first inner and outer field coils in a longitudinal direction.

2. A dynamoelectric machine as recited in claim 1, further comprising:
   a second inner field coil supported by said stator structure and positioned around a second portion of said rotor;
   a second outer field coil supported by said stator structure, concentric with said rotor axis and longitudinally spaced from said second inner field coil;
   said second inner and outer field coils being wound to produce solenoidal magnetic flux in the same direction as each other but in an opposite direction to the solenoidal magnetic flux produced by said first inner and outer field coils; and
   a second current collecting brush assembly for conducting current with a circumferential component to produce solenoidal magnetic flux in the same direction as magnetic flux produced by said second inner and outer field center, said second current collecting brush assembly including a second plurality of brush boxes, each connected at one end to a second cylindrical conductor, each lying at an inclined angle with respect to the axis of said rotor, and each being generally positioned between said second inner and outer field coils in a longitudinal direction.

3. A dynamoelectric machine comprising:
   a stator structure;
   a rotor having a central axis, being positioned within said stator structure and being mounted for rotation with respect to said stator;

an inner field coil supported by said stator structure and positioned around a first portion of said rotor;

an outer field coil supported by said stator structure, concentric with said rotor axis and longitudinally spaced from said inner field coil;

said inner and outer field coils being wound to produce solenoidal magnetic flux in the same direction;

a current collecting means capable of making electrical contact with a second portion of said rotor, said current collecting means being positioned between said inner and outer field coils and being generally rectangularly shaped and inclined at an angle with respect to said rotor axis in a circumferential direction, so that current flowing in said current collecting means has a circumferential component which adds flux to the magnetic field produced by said inner and outer coils and reduces radial flux in the vicinity of the second portion of said rotor; and a flux shaping coil supported by said stator structure, concentric with said rotor axis and positioned radially outward from said current collecting means.

4. A dynamoelectric machine as recited in claim 3, wherein said rotor and said stator structure are constructed of non-magnetic material.

5. A dynamoelectric machine comprising:
a stator structure;
a rotor having a central axis, being positioned within said stator structure and being mounted for rotation with respect to said stator structure;
an inner field coil supported by said stator structure and positioned around a first portion of said rotor;
an outer field coil supported by said stator structure, concentric with said rotor axis and longitudinally spaced from said inner field coil;
a current collecting means capable of making electrical contact with a second portion of said rotor, said current collecting means being positioned between said inner and outer field coils; and
a flux shaping coil supported by said stator structure, concentric with said rotor axis and positioned radially outward from said current collecting means;
said inner, outer and field shaping coils being wound to produce solenoidal magnetic flux in the same direction.

6. A dynamoelectric machine as recited in claim 5, wherein said rotor and said stator structure are constructed of non-magnetic material.

7. A dynamoelectric machine as recited in claim 5, wherein said current collecting means comprises:
a generally rectangular brush assembly being inclined at an angle with respect to the rotor axis in a circumferential direction.

* * * * *